Patented Aug. 17, 1948

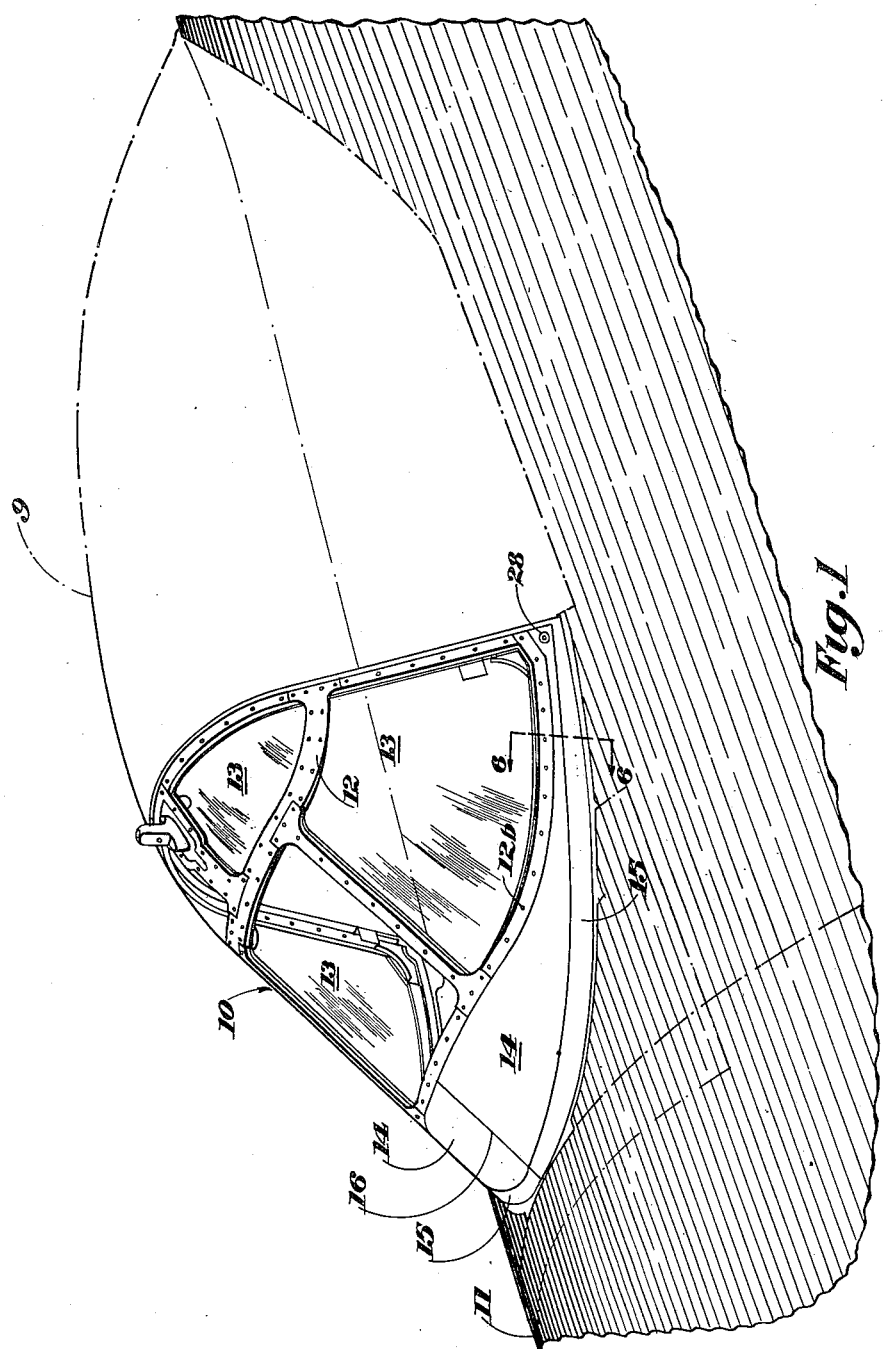

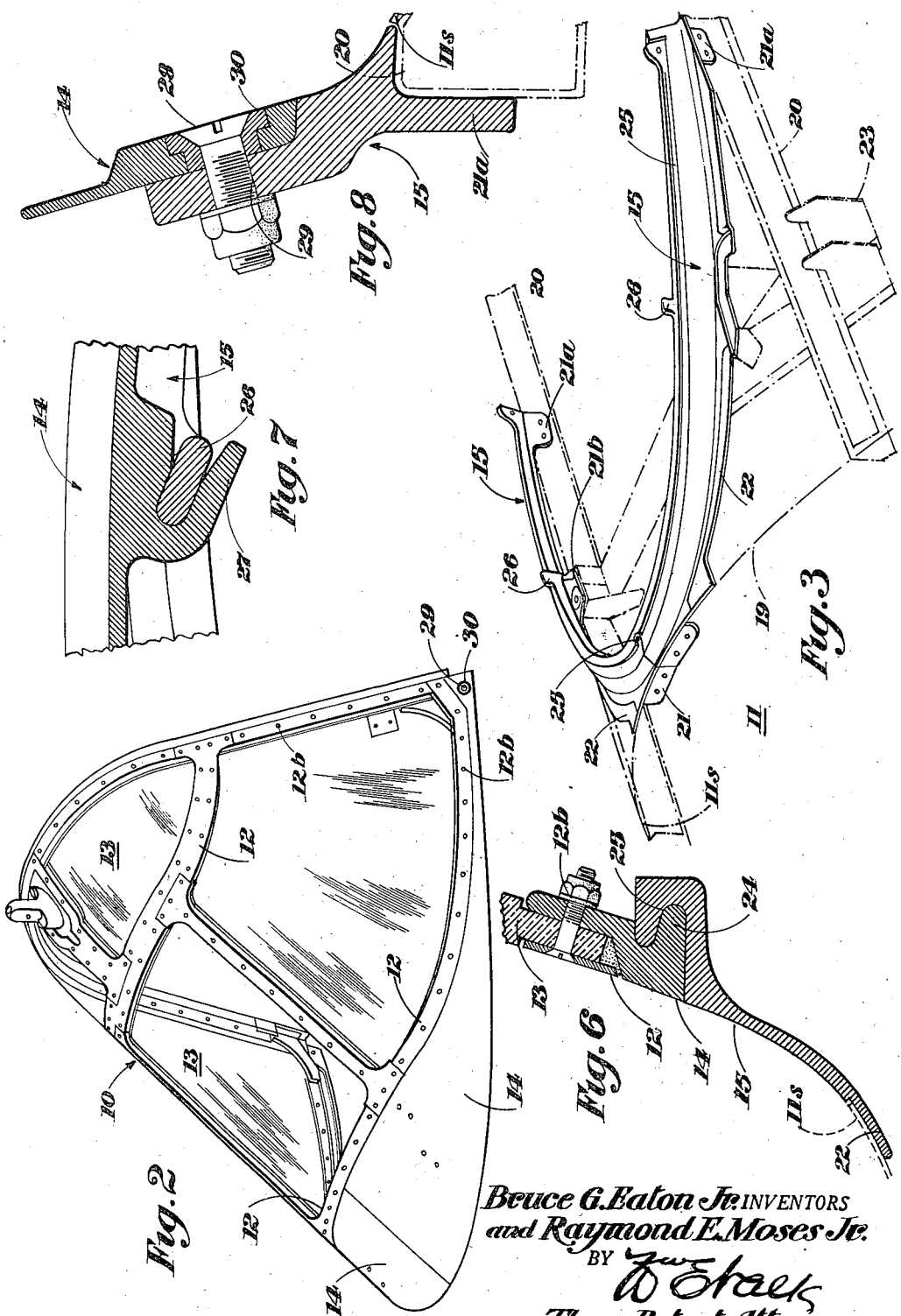

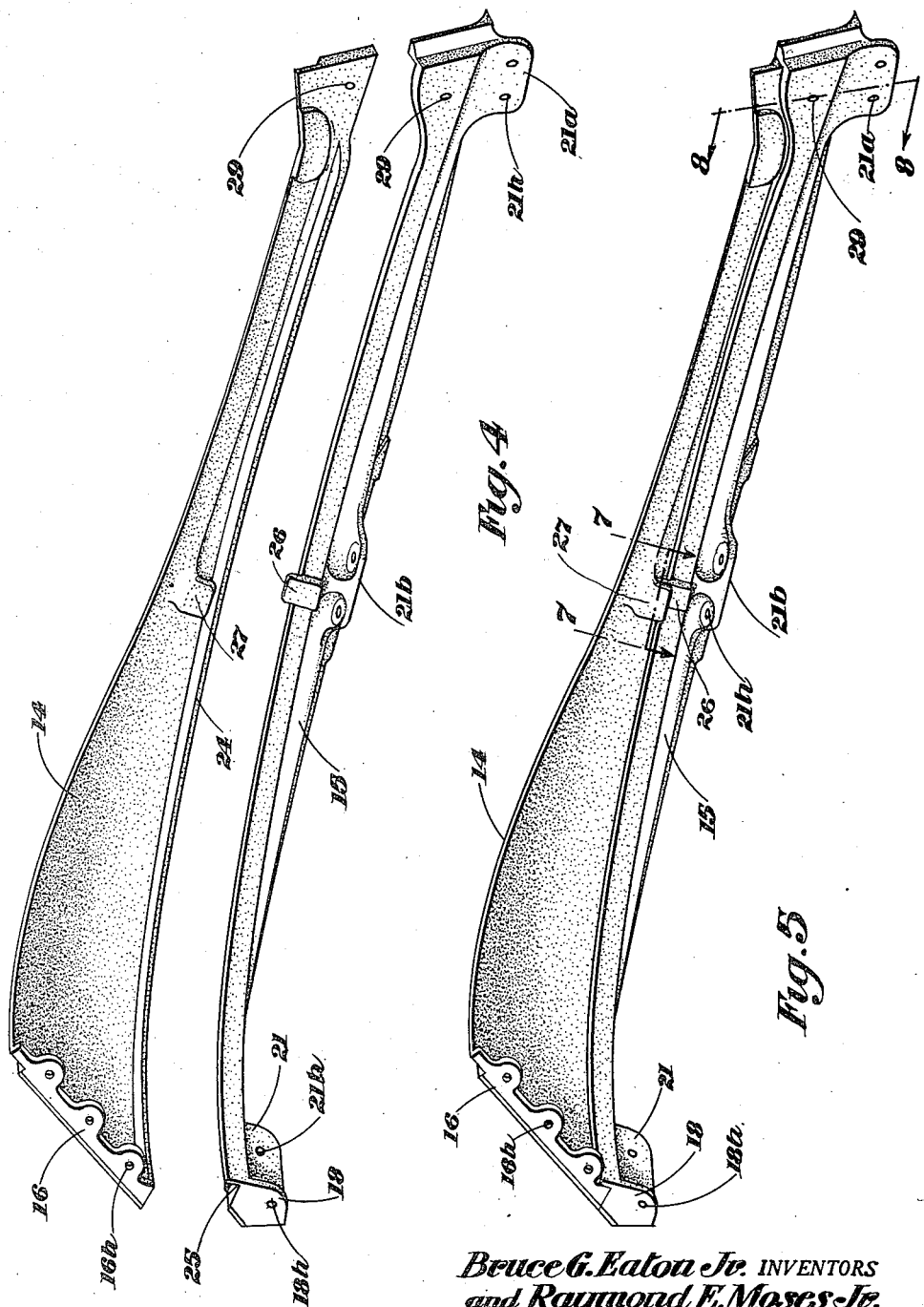

2,447,059

UNITED STATES PATENT OFFICE 2,447,059

WINDSHIELD MOUNTING DEVICE

Bruce G. Eaton, Jr., Buffalo, N. Y., and Raymond E. Moses, Jr., Tunkhannock, Pa., assignors to Curtiss-Wright Corporation, a corporation of Delaware Application July 25, 1945, Serial No. 606,994

9 Claims. (Cl. 244—121)

The present invention relates to mounting devices and more particularly to a mounting which may be used to advantage in connection with aircraft, and the windshields of aircraft and other vehicles.

The instrument panels of modern airplanes are in many instances positioned directly in front of the pilot's seat and behind and below the cabin windshield. In such airplanes it is frequently necessary that the instruments in the panel be serviced, and heretofore in order to do so it usually has been necessary to either remove parts of the windshield or to remove the instrument itself in order to gain access to the forward wall or back of the panel.

Accordingly it is a major object of this invention to provide a windshield for an airplane that is easily and readily removed therefrom in its entirety. In carrying out this object it is another aim of the invention to provide a mounting for the removable windshield that permits of the ready removal and replacement of the windshield, without disturbing the permanent fastenings of the aircraft.

It is another object of the present invention to form the windshield mounting of a plurality of interfitting members which when constructed integrally with the airplane fuselage and the windshield, permits the ready detachment and attachment of the windshield from the airplane by sliding the windshield forwardly and rearwardly, respectively, relative to the fuselage.

It is still another object of this invention to construct the mounting members of the windshield and fuselage in such manner that when slidably interfitted they interlock the windshield with the fuselage and are secured against sliding movement by a simple, convenient mechanical means.

In carrying out the foregoing objects it is still another aim of the invention to form the mounting members as castings, the windshield casting forming the windshield base and the fuselage casting forming the edge of at least the forward part of the cockpit opening and fairing the windshield into the fuselage. Other and further objects and advantages will be apparent to those skilled in the art from the following description, references being had to the accompanying drawings wherein a preferred form of embodiment is shown.

In the drawings:

Figure 1 is a perspective view showing the invention in connection with a windshield and an adjacent portion of an airplane fuselage;

Figure 2 is a view of the windshield element shown in Figure 1;

Figure 3 is a view of the fittings by which the windshield is secured to the fuselage, showing adjacent structural members of the fuselage in phantom;

Figure 4 is an exploded perspective view of a pair of the mounting members, the view being taken looking at the backs or inner sides thereof;

Figure 5 is a view similar to Figure 4, but showing the same pair of mounting members in their assembled or nested positions;

Figure 6 is a view in section, the section being taken on line 6—6 of Figure 1;

Figure 7 is a view in section as taken on line 7—7 of Figure 5; and

Figure 8 is a view in section as taken on line 8—8 of Figure 5.

Referring to the drawings, and particularly to Figure 1, there is shown a windshield assembly attached to the fuselage 11 of an airplane. To the rear of the windshield there is provided a cockpit canopy 9, faired thereto and to the fuselage, and is suitably slidable or removable to permit access to the cockpit by the pilot. The windshield assembly 10 includes a framework 12, in which a plurality of transparent panels 13 are secured by the bolts 12b, and a pair of base castings 14 to which the framework 12 is attached. While the members 14 and 15 have been referred to as castings, it will be understood that they may be stamped or formed or of other suitable construction. The windshield assembly is secured to the fuselage 11 by a pair of fuselage castings 15 which form the forward contour of the cockpit opening and serve to fair the junction between the windshield and fuselage contours. The castings 14 and 15 will be referred to hereinafter as the base and fuselage castings, respectively.

In the embodiment of the invention which has been selected and shown in the drawings there are two similar base castings 14, one right hand and the other left hand, being bolted together through the flanges 16 at their leading edge to form a base assembly. Likewise the fuselage mounting is comprised of a pair of right and left hand castings 15 which are bolted together through their leading edge flanges 18 to form the fuselage casting assembly. This assembly may be secured to the fuselage in any suitable manner, but is shown herein as being attached to the transverse firewall 19 and longerons 20 of the fuselage by means of the flanges 21 and 21a, respectively, of the castings 15. Intermediate flanges 21b are provided on the members 15 for attachment to the transverse fuselage former 23. The castings 15 are also each provided with a recessed flange 22 which is adapted to receive the skin 11s of the fuselage in such manner as to provide a smooth faired joint in order that air flowing across the joint will be substantially undisturbed, and its turbulence and resistance reduced. A plurality of bolt holes 16h, 18h and 21h are provided for bolting through these flanges.

Both the base casting assembly and fuselage casting assembly are substantially of opened V- or U-shape and are adapted to be interlocked by interfitting a tongue 24 on the base assembly into a groove 25 on the fuselage assembly and then sliding the base assembly rearwardly until the assemblies are nested in their faired position as indicated in the detail in Figure 6. This tongue and groove interlock is supplemented by a vertical stud 26 which protrudes upwardly from the inside of each casting 15 and is adapted to engage a hook portion 27 of each base casting 14 to restrain outward bending or movement of the castings 14. When the assemblies are thus interlocked they can only be disengaged by sliding the base assembly forward from the nested position and therefore any simple mechanical means may be utilized to prevent relative sliding movement of the assemblies with respect to one another. In ths embodiment the mechanical means utilized is preferably a flat headed bolt 28 which is received by the aligned openings 29 in the trailing or after ends of the legs of the castings. Since the material from which the castings are made is relatively soft it is desirable that a bushing 30 of a harder material be positioned in the opening 29 in the outer or base casting 14 to receive the head of the bolt 28 which also acts to positively retain the ends of the tongue and groove in absolute engagement.

From the foregoing it will be readily seen that there has been provided a mounting which may be used with particular advantage in securing a windshield to the fuselage of an airplane and which permits of easy and ready attachment and detachment thereof by slidably interfitting the windshield to the fuselage and finally securing them by a bolt or other simple mechanical means. It will also be seen that the windshield cannot expand at the base to disengage its fastenings, the interfitting studs 26 and hooks 27 securing the center portions and the bolts 28 securing the ends of the base against outward movement.

Other forms and modifications of the present invention, both with respect to its general arrangement and the details of its respective parts, which may become apparent to those skilled in the art after reading this description, are intended to come within the scope and spirit of this invention as more particularly set forth in the appended claims.

We claim:

1. In aircraft, a forwardly converging fuselage member having a forwardly and laterally opening groove, a readily removable windshield having a similarly forwardly converging portion, a rearwardly and inwardly directed tongue on said windshield portion adapted to engage said fuselage member groove, both said fuselage member and windshield tongue and groove engaging portions being similarly U-shaped in outline such that separation can take place only by forward sliding movement of said windshield with respect to said fuselage member, and attachment means engaging said fuselage member and said windshield portion arranged to prevent relative fore and aft movements therebetween.

2. In aircraft, a forwardly converging fuselage member having an outwardly opening groove, a readily removable windshield having a similarly forwardly converging portion, an inwardly directed tongue on said windshield portion adapted to engage said outwardly opening fuselage member groove, the tongue and groove engaging portions of said fuselage member and windshield having similar arched configuration in plan form such that their separation can take place only by relative forward sliding movement of said windshield, and attachment means engaging the rearward terminals of said fuselage member and said windshield portion arranged to prevent relative fore and aft movements therebetween.

3. In aircraft, a forwardly converging fuselage member having a forwardly and laterally opening groove, a readily removable windshield having a similarly forwardly converging tongue portion adapted to engage said fuselage member groove, wedging means cooperatively carried by said fuselage member and said windshield portion arranged to prevent relative lateral movements, and attachment means engaging said fuselage member and said windshield portion arranged to prevent relative fore and aft movements therebetween.

4. In aircraft construction, a fuselage structure including a pair of laterally spaced longerons framing a cockpit opening, said cockpit opening being of U-shape with its closed end extending in a forward longitudinal direction, a U-shaped member fixedly attached to said fuselage longerons, a removable windshield having a complementary U-shaped base portion adapted upon rearward sliding movement to closely engage said fuselage member, wedging tongue and groove means cooperatively carried by said fuselage structure and said windshield arranged to prevent relative lateral and vertical displacement, and attachment means connecting the rearward terminals of said fuselage and windshield members arranged to prevent disengagement thereof.

5. In aircraft windshield construction, a forwardly converging fuselage member having a forwardly and laterally opening groove, a readily removable windshield having a similarly forwardly converging portion, a rearwardly and inwardly directed tongue on said windshield portion adapted to engage said fuselage member groove, wedging means cooperatively carried by the lateral intermediate portions of said fuselage member and said windshield portion arranged to prevent relative lateral movement therebetween and attachment means engaging the rearward terminals of said fuselage member of said windshield portion arranged to prevent relative fore and aft movements therebetween.

6. In aircraft windshield construction, a forwardly converging rearwardly open fuselage member having a forwardly and outwardly opening groove, said groove having rearwardly terminating laterally spaced ends, a readily removable windshield having a similarly shaped and dimensioned forwardly converging rearwardly open portion, and a rearwardly and inwardly directed tongue carried by said windshield adapted upon relative rearward bodily movement to engage said fuselage member groove, the said tongue and groove being shaped and dimensioned to slidably and interfittingly engage each other and define a common coinciding plane along which the said relative engagement and disengagement movements are restricted, thereby preventing relative lateral and vertical movements therebetween.

7. In aircraft windshield construction, a forwardly converging fuselage member having a forwardly and laterally opening horizontally extending groove, said groove having rearwardly terminating ends, a readily removable windshield having a similarly forwardly converging portion, and a rearwardly and inwardly directed tongue on said windshield portion shaped and dimensioned to slidably and interfittingly engage said fuselage member groove upon relative rearward bodily movement in a horizontal direction, said slidable and interfitting engagement being such that said windshield is restricted to horizontal movements and is restrained from relative lateral or vertical separating movements from said fuselage.

8. Means for attaching a removable windshield to a fuselage structure about a cockpit opening therein comprising a recessed curvilinear member carried by the fuselage structure, the said windshield having a matching curvilinear base member, said base member being shaped and dimensioned to slidably and interfittingly engage the recess of said first curvilinear member, said first curvilinear member forming the forward edge of said cockpit opening and serving to fair said windshield into the fuselage, and attachment means engaging both said members arranged to prevent relative movement therebetween.

9. In aircraft, a fuselage structure framing a cockpit opening, a curvilinear member fixedly carried by said fuselage structure around a front edge of said cockpit opening, a removable windshield having a curvilinear base portion, said base portion shaped and dimensioned to slidably and interfittingly engage said curvilinear fuselage member, wedging means cooperatively carried by said fuselage structure and said windshield arranged to prevent relative lateral movements therebetween and fastening means joining said slidably and interfittingly engaging curvilinear members adjacent the rearward terminals thereof to prevent their longitudinal disengagement.

BRUCE G. EATON, Jr.
RAYMOND E. MOSES, Jr.

REFERENCES CITED

The following references are of record in the file of this patent:

UNITED STATES PATENTS

| Number | Name | Date |
| --- | --- | --- |
| 1,991,832 | Zand | Feb. 19, 1935 |
| 2,258,724 | Wagner et al. | Oct. 14, 1941 |
| 2,293,656 | McClain | Aug. 18, 1942 |
| 2,295,345 | Jerman | Sept. 8, 1942 |